United States Patent [19]

Leigh-Monstevens et al.

[11] Patent Number: 4,817,468
[45] Date of Patent: Apr. 4, 1989

[54] ELECTRIC SHIFT APPARATUS FOR MANUAL TRANSMISSION

[75] Inventors: Keith V. Leigh-Monstevens, Troy; Edward L. Tury, Brighton; Leslie P. Branum, Troy; Gregg A. Thoe, Farmington, all of Mich.

[73] Assignee: Ap Aero, Inc, Sterling Heights, Mich.

[21] Appl. No.: 64,099

[22] Filed: Jun. 18, 1987

[51] Int. Cl.⁴ .................................................. G05G 9/00
[52] U.S. Cl. .......................................... 74/335; 74/365
[58] Field of Search .................................... 74/335, 365

[56] References Cited

U.S. PATENT DOCUMENTS

| | | |
|---|---|---|
| 2,578,142 | 12/1951 | Mayrath . |
| 2,578,158 | 12/1951 | Toot . |
| 2,621,533 | 12/1952 | Schotz . |
| 2,631,701 | 3/1953 | Ainsworth et al. . |
| 2,634,838 | 4/1953 | Price . |
| 2,758,683 | 8/1956 | Randol . |
| 3,049,934 | 8/1962 | Butler et al. ............... 74/335 |
| 3,106,852 | 10/1963 | Miller . |
| 3,130,596 | 4/1964 | Gorski . |
| 3,335,618 | 8/1967 | Russey . |
| 3,448,640 | 6/1969 | Nelson . |
| 3,527,116 | 9/1970 | Kimberlin ............... 74/335 X |
| 4,602,528 | 6/1986 | Bailey . |
| 4,610,179 | 9/1986 | Parker ........................ 74/335 |
| 4,621,328 | 11/1986 | Arai et al. ................ 74/365 X |
| 4,664,217 | 5/1987 | Welch et al. ........... 79/337.5 X |

FOREIGN PATENT DOCUMENTS

| | | |
|---|---|---|
| 1198501 | 12/1985 | Canada ........................ 341/68 |
| WO81/03000 | 10/1981 | PCT Int'l Appl. . |
| 863327 | 7/1959 | United Kingdom . |
| 1099404 | 4/1965 | United Kingdom . |
| 1170681 | 1/1967 | United Kingdom . |
| 1295060 | 11/1972 | United Kingdom . |
| 1455606 | 2/1974 | United Kingdom . |
| 2015094 | 9/1979 | United Kingdom . |
| 2097077 | 10/1982 | United Kingdom . |

OTHER PUBLICATIONS

Rolls Royce Manual, 2 pages, Aug. 1977.
SAE Technical Paper 840448, Feb. 27, 1984.
SAE Technical Paper 831,776, Nov. 7, 1983.

Primary Examiner—David A. Scherbel
Assistant Examiner—Creighton Smith
Attorney, Agent, or Firm—Krass & Young

[57] ABSTRACT

An electric shift apparatus for controlling a motor vehicle manual transmission. The apparatus includes a power module adapted to be bolted to the housing of the transmission, a control module adapted to be positioned in the passenger compartment of the vehicle, and a gear selector assembly positioned on the steering column assembly of the vehicle. The operator selects a transmission position by movement of an appropriate gear lever on the steering column, a signal corresponding to the selected position is transmitted to the control module, the control module compares this signal to a signal provided by limit switches in the power module indicating the instantaneous position of the transmission, and the control module generates a signal to the power module coded to impart the specific combination and sequence of crossover and shift movements to the transmission select lever required to move the select lever from its indicated crossover and shift position to the crossover and shift positions corresponding to the operator selected position. The required linear movement of the shift lever is provided by a ball screw assembly powered by a first electric motor and the required angular or crossover movement of the select lever is provided by a speed reduction unit driven by a second electric motor.

39 Claims, 3 Drawing Sheets

ELECTRIC SHIFT APPARATUS FOR MANUAL TRANSMISSION

BACKGROUND OF THE INVENTION

This invention relates to an electric shift apparatus especially suited for use with a motor vehicle having a manual transmission.

Motor vehicles since their inception have required some manner of gear change mechanism to satisfy the varying torque and speed requirements encountered during the typical duty cycle of a motor vehicle. For many years these gear change mechanisms were manual in the sense that they required an operator input from a shift lever or the like to effect each desired gear change ratio. More recently, so called "automatic" transmissions have become popular in which much of the shifting is done without operator input in response to sensed speed and throttle opening parameters. These automatic transmissions however are typically relatively expensive and inherently involve a fuel economy penalty as compared to manual transmissions. Various attempts have been made in the past to combine the low cost and superior fuel economy aspects of a manual transmission with the convenience aspects of an automatic transmission, and, specifically, various attempts have been made to provide automatic or semi-automatic shifting for manual transmissions. However, none of these prior art attempts to facilitate and simplify the shifting of a manual transmission have met with any degree of commercial success since they provided a slow or imprecise shifting action and/or have generated excessive warranty and maintenance costs.

SUMMARY OF THE INVENTION

This invention is directed to the provision of an electric shift apparatus for a manual transmission of a motor vehicle which provides positive and precise shifting, which is amenable to ready installation in the motor vehicle at the time of the original motor vehicle manufacture, and which is reliable in operation even over a long motor vehicle life.

The invention electric shift apparatus is intended for use with a manual transmission of the type including a plurality of forward speeds, a reverse position, and a neutral position. The invention apparatus includes a gear selector assembly adapted to be positioned in the passenger compartment of the vehicle and including gear selector means having a separate select position corresponding to each position of the transmission and operative in response to operator selection to generate a plurality of electrical gear select signals respectively corresponding to each position of the transmission, and a electrical power module adapted to be secured to the housing of the transmission and operative in response to receipt of each of the gear select signals to move the transmission respectively to the transmission position corresponding to the received gear select signal. This arrangement is amenable to ready installation in the motor vehicle at the time of original motor vehicle assembly and provides positive and reliable shifting of the manual transmission in response to operator selection of a particular desired gear position.

According to a further feature of the invention, the apparatus further includes position sensing means operative to sense the position of the transmission and operative to generate an electrical position signal indicative of the position of the transmission and a control module including comparator means; and the comparator means receives the gear select signals and the position signals, compares the signals, and transmits an electrical control signal to the power module coded to energize the power module in a sense to move the transmission to the selected position. This arrangement provides positive and precise shifting of the transmission in response to the operator selection of a desired position.

According to a further feature of the invention, the comparator means is further operative in response to arrival of the transmission in the selected position to deenergize and brake the electrical power module. This arrangement ensures that the transmission is moved positively and precisely to the selected position without overrun of the desired position.

According to a further feature of the invention, the electric power module includes a drive link adapted to be connected at one end to the transmission and electrical motor means operative to impart linear and angular movement to the drive link to move the shift rails of the transmission in a shift and crossover direction respectively. This arrangement allows the invention shift apparatus to quickly and efficiently perform the desired shifting operation by performing the known crossover and shift movements of the shift rail required to achieve the desired shifting operation.

According to a further feature of the invention, the electric power module includes first electric motor means having a linearally movable output member operative to impart the desired linear movement to the drive link, and second electric motor means having an angularly movable output shaft operative to impart the desired angular movement to the drive link. This arrangement allows the desired and required shift and crossover movements of the shift rails to be precisely programmed and precisely carried out.

According to a further feature of the invention, the position sensing means includes first position sensing means operative to sense the linear position of the output member of the first motor means and second position sensing means operative to sense the angular position of the output shaft of the second motor means. This arrangement allows the precise crossover and shift positions of the shift rails to be known at any given time so as to facilitate the operation of the comparator means in determining the crossover and shift movements necessary to achieve the selected shift position.

According to a further feature of the invention, the first position sensing means includes a first plurality of limit switches arranged along the linear path of the output member of the first motor means and sensing the linear position of the output member, and the second position sensing means includes a second plurality of limit switches arrayed about the output shaft of the second motor means and sensing the angular position of the output shaft. This arrangement provides a precise and inexpensive means of determining the precise position of the transmission at any given time.

According to a further feature of the invention, the electric power module includes a joint mechanism mounting the other end of the drive link for linear and angular movement; the joint mechanism includes a fork member drivingly connected to the output shaft of the second motor means so as to be rotated thereby and including opposite arm portions having slots therein; and the other end of the drive link includes pins guiding in the slots in the arm portions of the fork member. This arrangement provides a convenient, inexpensive and efficient means for imparting the required angular and linear movement to the drive link.

According to a further feature of the invention, the joint mechanism further includes a journal member at the free end of the output member of the first motor means and the other end of the drive link is journaled in the journal member. This arrangement further facilitates the desired angular and linear movement of the joint mechanism and thereby of the drive link.

According to a further feature of the invention, the first electric motor means comprises an electric motor driving a ball screw assembly including a nut member, and the nut member constitutes the linearly movable output member for imparting the desired linear movement to the drive link.

According to a further feature of the invention, the second electric motor means comprises an electric motor driving a speed reduction unit having an output shaft, and the speed reduction output shaft constitutes the output shaft for imparting the desired angular movement to the drive link.

According to a further feature of the invention, the first position sensing means includes a cam means on the journal member selectively coacting with the first plurality of limit switches; and the second position sensing means includes a cam member on the output shaft of the speed reduction unit of the second motor means selectively coacting with the second plurality of limit switches. This arrangement provides an inexpensive and efficient means of determining the precise instantaneous position of the transmission.

According to a further feature of the invention, the control module further receives a vehicle speed signal and the comparator means is further operative to compare the received gear select signal with the received vehicle speed signal before energizing the electric drive mechanism. This arrangement allows the invention electric shift apparatus to prohibit shifts that would be harmful to the transmission or to the associated engine.

According to a further feature of the invention, the electric shift apparatus further includes indicator means adapted to be positioned in the passenger compartment of the vehicle and operative to indicate whether the selected gear position represents an allowed shift for the transmission. This arrangement alerts the operator in the event that he has attempted to initiate an inappropriate shift for the transmission.

According to a further feature of the invention, the indicator means includes an illegal shift light adapted to be positioned in the instrument panel of the vehicle and the comparator means is operative to illuminate the illegal shift light when the received gear select signal is inappropriate in view of the received vehicle speed signal.

According to a further feature of the invention, the indicator means further includes a shift complete light adapted to be positioned in the instrument panel of the vehicle and the comparator means is further operative to illuminate the shift complete light when the transmission arrives in the selected position.

According to a further feature of the invention, the control module further receives a vehicle clutch disengage signal and the comparator means is further operative to refuse to generate a shift signal in the absence of a clutch disengage signal. This arrangement ensures that no attempt will be made to shift the transmission unless and until the clutch has been disengaged by the operator.

DETAILED DESCRIPTION OF THE PREFERRED EMBODIMENT

Figure 1:
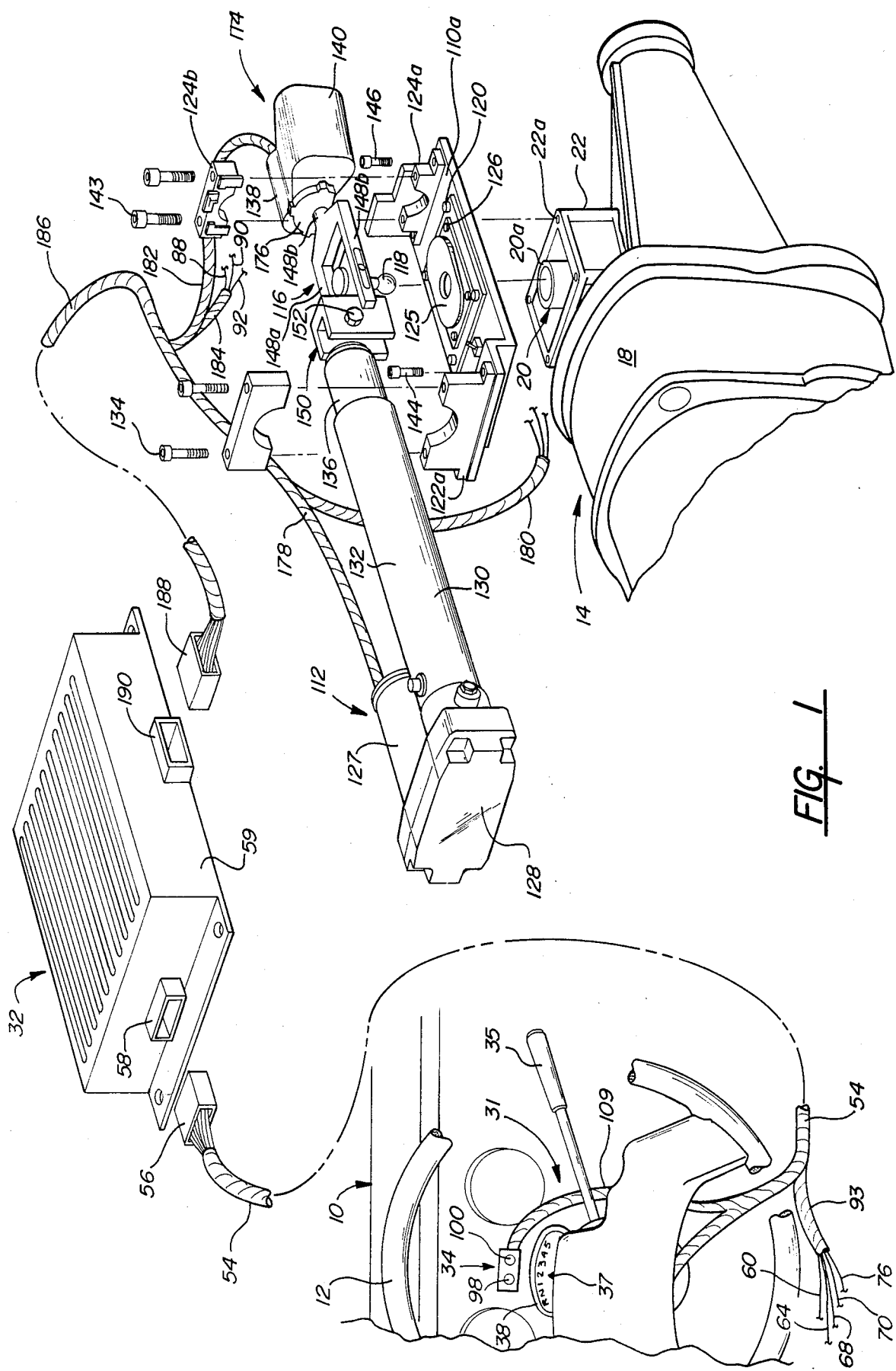
FIG. 1 is a fragmentary perspective view of an electric shift apparatus according to the invention.
Figures 2, 3, 4, 5, 6:
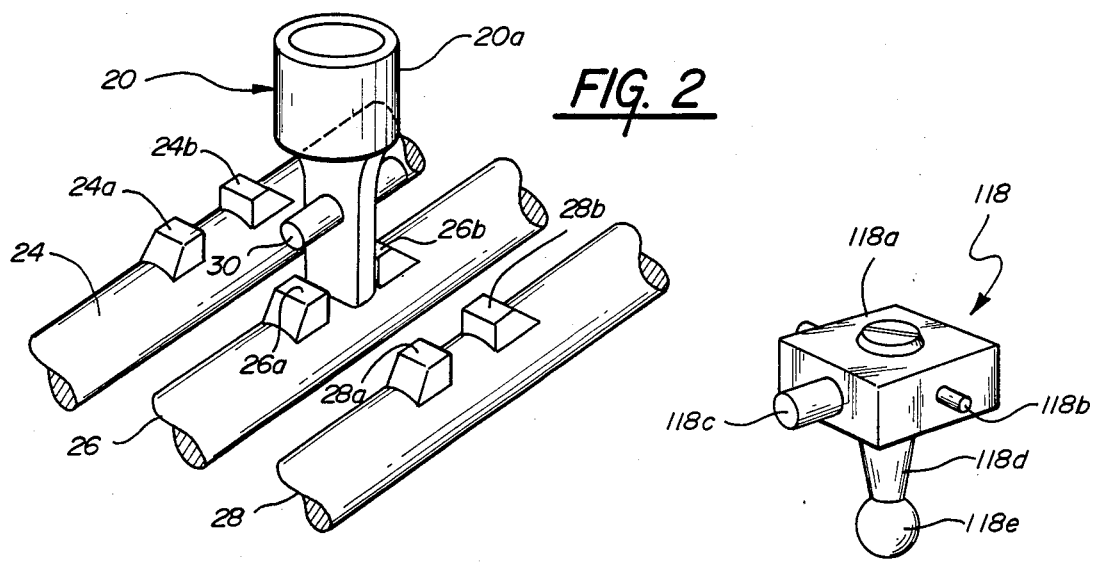
FIG. 2 is a fragmentary perspective view showing the basic internal operation of the manual transmission seen in 1.
FIG. 3 is a diagrammatic view showing the gating of the transmission.
FIG. 4 is a fragmentary side elevational view showing an electric power module employed in the electric shift a of FIG. 1.
FIG. 5 is a cross-sectional view taken on line 5—5 of FIG. 4.
FIG. 6 is a perspective view of a drive link employed in the shift apparatus.

The invention electric shift apparatus is seen schematically in FIG. 1 in association with a motor vehicle of the type including an instrument panel assembly 10 positioned within the passenger compartment of the motor vehicle; a steering wheel 12 associated with the instrument panel; and a manual transmission assembly 14 including a clutch housing 16 and a transmission housing 18. The transmission 14 includes a mode select lever 20 positioned in a tower 22 and, as seen in FIG. 2, engagable at its lower end with a plurality of shift rails 24, 26, 28, each having a forward, neutral, and rearward position. Mode select lever 20 is mounted on a shaft 30 with in the transmission for pivotal or crossover movement between rails 24, 26 and 28 to selectively move into driving relationship with spaced drive lugs 24a, 24b, 26a, 26b and 28a, 28b on the shift rails 24, 26 and 28 so as to be selectively drivably engaged with the shift rails. Lever 20 is also mounted for axial movement so as to move the engaged shift rail axially between its forward, neutral, and rearward positions. As seen in FIG. 3, mode select lever 20 is thus capable, by a combination of crossover and axial movements, to move shift rails 24, 26 and 28 forwardly and rearwardly to achieve five forward speeds and one reverse speed. Specifically, first and second speeds may be achieved by axial forward and rearward movement of rail 24; third and fourth speeds may be achieved by axial forward and rearward movement of rail 26, and fifth speed and reverse may be achieved by axial forward and rearward movement of rail 28.

The invention electric shift apparatus includes a gear selector assembly 31, a control module 32, a power module 33, and an instrument panel module 34. Broadly considered, gear selector assembly 31 is adapted to be positioned in association with the steering column assembly of the motor vehicle; control module 32 is adapted to be positioned in the passenger compartment of the motor vehicle; power module 33 is adapted to be bolted to the housing of the transmission; and instrument panel module 34 is adapted to be mounted in the instrument panel of the motor vehicle.

Gear selector assembly 31 includes a gear selector lever 35 mounted for pivotal movement about end 36 and including a pointer 37; a quadrant member 38 carrying suitable indicia such as R,N, 1, 2, 3, 4, 5 corresponding to the positions of the associated transmission; and a plurality of leads 40, 42, 44, 46, 48, 50 and 52 respectively associated with each of the quadrant positions R,N, 1, 2, 3, 4, 5 and respectively representing circuits that are completed in response to movement of selector lever 35 to a respective position so that leads 40–52 respectively carry control signals respectively generated in response to movement of selector lever 35 through the various indicated positions. Leads 40–52 may for example be embodied in a single cable 54 extending from quadrant 38 to control module 32 and terminating in a suitable plug 56 for plugging receipt in a socket 58 in the housing 59 of the control module.

Other input leads to control module 32 include a lead 60 associated with the ignition switch 62 of the motor vehicle; a lead 64 connected to the existing speed sensor 66 of the motor vehicle; leads 68 and 70 connected to the negative and positive terminals of the battery 72 of the vehicle and including a fuse 74; a lead 76 associated with a switch 78 adapted to be actuated in response to operator depression of the clutch pedal 80 of the vehicle; and a plurality of position indicator leads 82, 84, 86, 88, 90 and 92. Leads 60, 64, 68, 70 and 76 are embodied in a cable 93 which is bundled into cable 54 so as to be connectable to control module 32 via plug 56 and socket 58.

Output leads from control module 32 include leads 94 and 96 associated respectively with electric bulbs 98 and 100 embodied in instrument panel module 34, and power leads 102, 104, 106 and 108 associated with power module 33. Leads 94 and 96 are embodied in a cable 109 which is bundled into cable 54 so as to be connectable to control module 32 via plug 56 and socket 58.

Power module 33 includes a bracket 110; a linear motor assembly 112; an angular motor assembly 114; a joint mechanism 116; and a drive link 118. Bracket 110 is adapted to be secured to the upper face of transmission tower 22 by a plurality of bolts 120 passing downwardly through suitable holes in the bracket for threaded receipt in threaded bores 22a in tower 22. A first bearing block assembly 122a, 122b is secured to the front end of bracket 110, a second bearing block assembly 124a, 124b is secured to the rear end of the bracket, and an elastomeric boot 125 is secured to the upper face 110a of the bracket in overlying relation to an aperture 110b in the bracket by a plurality of screws 126.

Linear motor assembly 112 may be of the type, for example, available from Saginaw Division of General Motors Corporation as Model HiTec 90. Assembly 112 includes an electric motor 127 connected to output leads 106,108 from control module 32, a gear reduction unit 128 driven by motor 127, and a ball screw assembly 130 driven by gear reduction unit 128. Ball screw assembly 130 includes an outer tube 132, clamped between the upper and lower bearing block halves 122a,122b by bolts 134, and an inner tube or nut 136 which is advanced or retracted linearly and in known manner in response to energization of motor 127.

Angular motor assembly 114 includes an electric DC motor 138 connected to output leads 102,104 from control module 32, and a speed reduction unit 140 driven by motor 138 and having an output shaft 142. Assembly 114 may for example comprise a unit available from Buhler Products Inc. of Raleigh, N.C. as part no. 61.42.322. Output shaft 142 of motor assembly 114 is received within the upper and lower bearing block halves 124a,124b with a suitable bushing (not shown) positioned between the faces of the bearing block halves and the shaft 142 to firmly position shaft 142 within the bearing block but allow rotational movement of the shaft within the bearing block. Bolts 143 secure bearing block half 124a to bearing block half 124b. Motor assembly 114 is mounted in suitable fashion on an upstanding flange portion 110c at the rear end of bracket 110, and bearing block assemblies 122 and 124 are suitably secured to the front and rear ends, respectively, of bracket 110 by bolts 144 and 146.

Joint mechanism 116 includes a fork member 148, including left and right fork arms 148a and 148b defining axially extending slots 148c, and a journal member 150. Journal member 150 is suitably secured as by a bolt 152 to the flattened end portion 136a of nut 136 and includes a blind bore 150a opening in its rear face 150b. Fork member 148 further includes a central shaft portion 148d forming a forward extension of the output shaft 142 of speed reduction unit 140.

Drive link 118 includes a monolithic main body portion 118a sized to fit slidably between fork arms 148a and 148b, diametrically opposed and laterally extending pin portions 118b, a forwardly extending journal portion 118c, a downwardly extending stem portion 118d, and a ball joint portion 118e. Drive link 118 is mounted in joint mechanism 116 with pin portions 118i b guiding in slots 148c, journal portion 118c journaling in blind bore 150a of journal member 150, and stem portion 118d extending downwardly through boot 125 to dispose ball joint portion 118a in a position for coaction with transmission select lever 20.

A plurality of limit switches 152, 154 and 156 are disposed on the upper face 110a of bracket 110 for coaction with cam lobes 158, 160 and 162 on the underface of journal member 150, and a further plurality of limit switches 164, 166 and 168 are positioned on upper bearing block half 124b for respective coaction with cam lobes 170, 172 and 174 provided at angularly spaced locations on a cam 176 secured to the output shaft 142 of speed reduction unit 140. Input leads 82, 84, and 86 to control module 32 are respectively connected to limit switches 152, 154 and 156, and input leads 88, 90 and 92 to control module 32 are respectively connected to limit switches 164, 166 and 168. Limit switches 152, 154 and 156 establish a forward, neutral, and rearward position for journal member 150 and are respectively spaced by amounts calibrated to move shift link 118 and thereby selector lever 120 by axial amounts necessary to move rails 24, 26 and 28 between their forward, neutral and rearward positions. For example, limit switches 152, 154 and 156 may be positioned to allow 10 millimeters of axial movement between each limit switch position and a total of 20 millimeters of axial movement between the forward and rearward positions of journal member 150. Similarly, limit switches 164, 166 and 168 establish left, center, and right angular positions of shaft 142 and are respectively spaced by angular amounts calibrated to move shift lever 118 and thereby mode select lever 20 by angular amounts necessary to move lever 20 angularly into respective driving relationship with rails 24, 26 and 28. For example, limit switches 164, 166 and 168 may be spaced to allow 19 degrees of angular movement between each limit switch position and a total of 38 degrees of angular movement between the extreme left and right positions of lever 118.

Motor leads 106 and 108 are contained in a cable 178; limit switch leads 82, 84 and 86 are contained in a cable 180; motor lead 102 and 104 are contained in a cable 182; limit switch leads 88, 90 and 92 are contained in the cable 184; and cables 178, 180, 182 and 184 are bundled together to form a cable 186 which terminates in a plug 188 for coaction with a socket 190 in housing 59 of control module 32.

OPERATION

The invention electric shift apparatus is installed in the associated motor vehicle during the original motor vehicle assembly process. Specifically, gear selector assembly 31 is assembled in association with the steering column assembly of the motor vehicle in much the same manner as the present automatic transmission controls are provided in association with the vehicular steering column; instrument panel module 34 is mounted in the instrument panel of the vehicle in proximity to quadrant 38 of gear selector assembly 31; control module 32 is mounted in the passenger compartment of the vehicle, preferably behind the front face of the instrument panel of the vehicle; power module 33 is secured to the housing of the vehicle transmission by the use of bolts 120 with the spherical end 118e of drive link 118 drivingly positioned in the hollow socket upper end 20a of mode select lever 20; plugs 56 and 188 are inserted into sockets 58 and 190 respectively of the housing 59 of control module 32; and leads 60, 64, 68, 70 and 76 embodied in cable 93 are respectively connected to the vehicle ignition, the vehicle speed sensor, the vehicle battery, and the clutch disengage switch. The system is now operational.

In use, it will be seen that limit switches 152, 154 and 156 provide a constant indication of the linear position of journal member 150, and thereby a constant indication of the linear or shift position of select lever 20, and limit switches 164, 166 and 168 provide a constant indication of the angular position of shaft 142 and thereby the angular or crossover position of select lever 20 so that the two position readings from the two sets of limit switches, taken together, provide an accurate and constant indication of the shift position of the transmission. Simultaneously, leads 40-52 provide a constant indication of the transmission position selected by the operator by appropriate positioning of shift lever 35; lead 60 provides a constant indication of the open or closed position of the vehicle ignition; lead 64 provides a constant signal representative of the instantaneous speed of the vehicle; leads 68 and 70 provide battery power for the system; and lead 76 provides an indication of the engagement or disengagement of the clutch.

Figure 7:
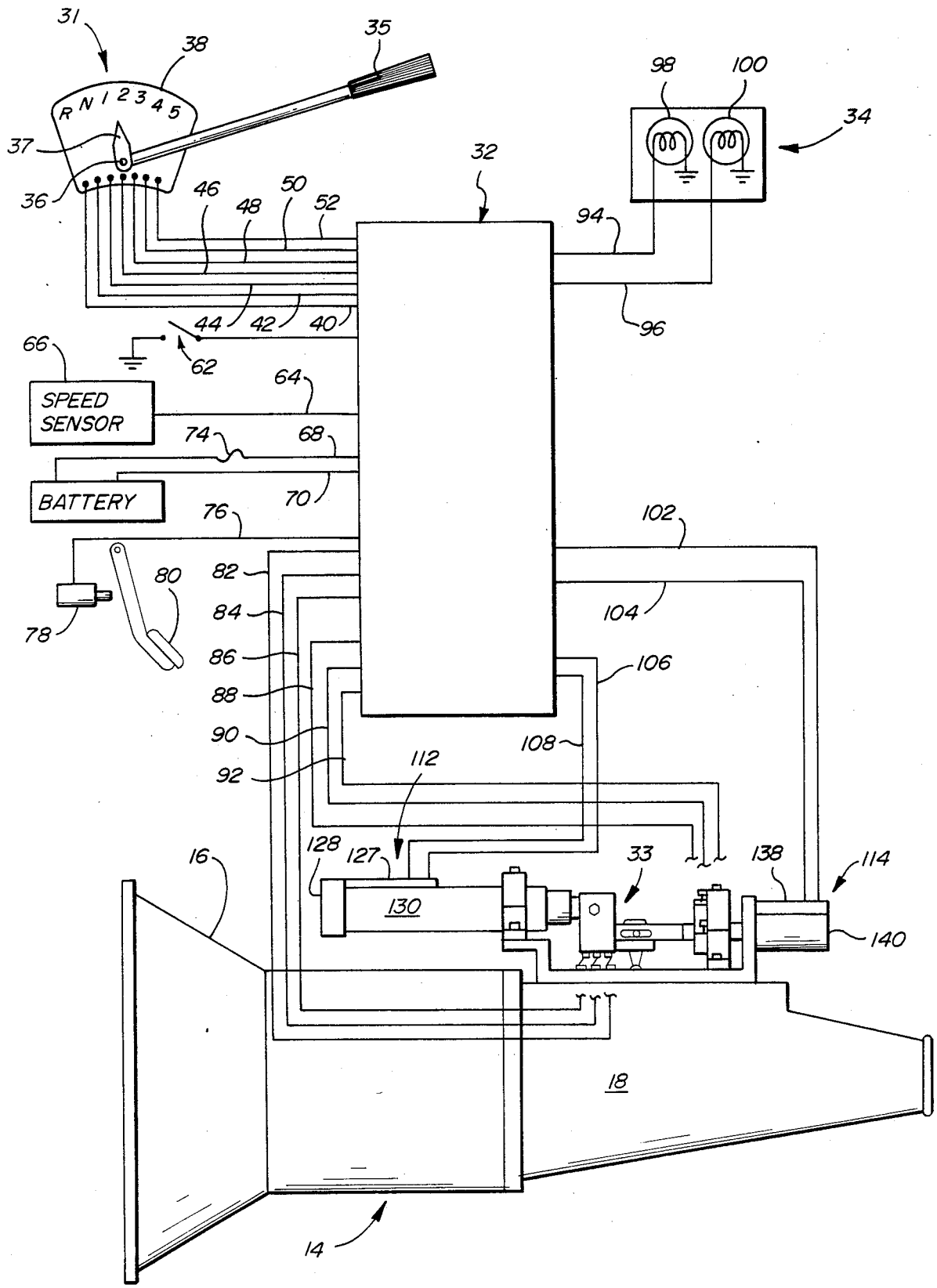
FIG. 7 is an electrical schematic diagram of the invention shift apparatus.

In use various input signals, such as described above and illustrated in FIG. 7, are supplied to control module 32, which preferably includes a programmable logic array or a gate array. Control module 32 is configured to receive these input signals and generate the necessary drive signals to linear motor assembly 112 and angular motor assembly 114 for providing the selection of the desired gear. Firstly, the various input signals are formed into a set of logic signals. These logic signals include a set of signals whose state is selected by the gear selector assembly 31; STR, STN, ST1, ST2, ST3, ST4 and ST5. In accordance with the preferred embodiment, control module 32 employs inverted logic. Thus one of these input signals, corresponding to the desired gear selected by the gear selector 31 is a logic "0" while the other of these signals is a logic "1". Similarily signals from limit switches 152, 154 and 156 permit generation of a set of logic signals SH1, SHN and SH2. One of these signals is an active "0" to indicate the present forward (SH1), neutral (SHN) or rearward (SH2) position of drive link 118. Signals from limit switches 164, 166 and 168 permit generation of a set of logic signals CO12, CO34 and CO5R. One of these signals is an active "0" to indicate the present left (CO12), middle (CO34) or right (CO5R) position of drive link 118. These six signals indicate the particular gear presently engaged. The speed sensor input signal is formed into five logic signals: SPEDR indicating the greatest speed permitted for entering reverse; SPED1 indicating the greatest speed permitted for entering first gear; SPED2 indicating the greatest speed permitted for entering second gear; SPED3 indicating the greatest speed permitted for entering third gear; and SPED4 indicating the greatest speed permitted for entering fourth gear. Each of these signals is an active "0" if its condition is satisfied and inactive if not. Note that these signals are cumulative, if the speed is over the speed of SPED4 then all will be active. The logic signal CL indicates the clutch is disengaged.

Control module 32 serves to compare the inputs indicating the gear selected with the inputs indicating the present gear. If they differ, then control module 32 generates the required sequence of output signals to linear motor assembly 112 and to angular motor assembly 114 until the present gear matches the selected gear. Four signals are produced by control module 32: COCW or crossover clockwise which causes angular motor assembly 114 to rotate to the right; COCCW or crossover counter clockwise which causes angular motor assembly 114 to rotate to the left; SHFTDN or shift down which causes linear motor assembly 112 to pull downward toward second, fourth and reverse gears; and SHFTUP or shift up which causes linear motor assembly 112 to push upward toward first, third and fifth gears.

Various intermediate signals are employed in the production of the four primary drive signals listed above. These intermediate signals are as follows. Signal 3THRUR indicates that one of the gears third, fourth, fifth or reverse has been selected by gear selector 31. It is formed by the Boolean equation:

3THRUR = Not(ST3) or Not (ST4) or Not(ST5) or Not(STR)

Because of the inverted logic convention 3THRUR is a "0" only if one of these gears is selected. Similarly 1THRU4 indicates that one of the gears first, second, third or fourth has been selected by gear selector 31. It is formed by the Boolean equation:

1THRU4 = Not(ST1) or Not(ST2) or Not(ST3) or Not(ST4)

The signal GEAROK indicates if the gear selected is appropriate for the current speed. This signal is formed by the Boolean equation:

GEAROK = (Not(ST1) and Not(SPED1)) or
(Not(ST2) and Not(SPED2)) or
(Not(ST3) and Not(SPED3)) or
(Not(ST4) and Not(SPED4)) or
Not(ST5) or
Not(STN) or -continued > (Not(STR) and Not(SPEDR))

The signal GEAROK is an active "1" when the selected gear is within the predetermined speed limit set to prevent overreving the engine. Note that no such engine protection is required when going to fifth gear or neutral. The signal PULLDOWN indicates that a shift requiring a downward motion of linear motor assembly 112 is required. This signal is formed as follows:

> PULLDOWN = (Not(CO12) and ST1) or
> (Not(CO34) and ST3) or
> (Not(CO5R) and ST5)

Thus PULLDOWN is an active "1" when (a) the drive link 118 is in the gate with first and second gears and first gear is not selected, or (b) the drive link 118 is in the gate with third and fourth gears and third gear is not selected, or (c) the drive link 118 is in the gate with fifth and reverse gears and fifth gear is not selected. The signal RETNEUT (for return to neutral) is formed of two other intermediate signals ENDERR and SHFTCOMP. The signal ENDERR is a timing signal which is an active "0" for a predetermined period of time after the beginning of a shift. The signal SHFTCOMP indicates when a shift is complete and is formed by the following equation.

> SHFTCOMP = (Not(SHN) and Not(STN))
> or (Not(SH2) and Not(CO12) and Not(ST2))
> or (Not(SH2) and Not(CO34) and Not(ST4))
> or (Not(SH2) and Not(CO5R) and Not(STR))
> or (Not(SH1) and Not(CO12) and Not(ST1))
> or (Not(SH1) and Not(CO34) and Not(ST3))
> or (Not(SH1) and Not(CO5R) and Not(ST5))

The signal RETNEUT is employed to indicate a missed shift and to require the drive link 118 return to the neutral position. This signal is formed as follows:

> RETNEUT = (ENDERR and Not(SHIFTCOMP)) or
> (Not(SHFTCOMP) and Not(CL) and
> SH1 and SH2 and SHR)

Thus RETNEUT indicates when the predetermined length of ENDERR has passed and the shift is not complete; or when the shift is not complete, the clutch is engaged and the drive link 118 is between positions of the limit switches 152, 154 and 156. These conditions indicate a missed shift.

The four drive signals COCW, COCCW, SHFTDN and SHFTUP will now be described. The signal COCW is formed from the following Boolean equation:

> COCW = (Not(SHN) and SH1 and SH2 and
> Not(CO34) and CO12 and CO5R and
> Not(ST5) and CL) or
> (Not(SHN) and SH1 and SH2 and
> Not(CO34) and CO12 and CO5R and
> Not(STR) and CL) or
> (Not(SHN) and SH1 and SH2 and
> Not(CO12) and CO34 and CO5R and
> Not(3THRUR) and CL)

Thus the angular motor assembly 114 is rotated to the right if (a) the drive link 118 is in neutral opposite third and fourth gears and either fifth or reverse gear is selected, or (b) the drive link 118 is in neutral opposite first and second gears and any gear from third, fourth, fifth or reverse gears is selected, in any event the clutch being disengaged. The signal COCCW is similarly formed according to the equation:

> COCCW = (Not(SHN) and SH1 and SH2 and
> Not(CO34) and CO12 and CO5R and
> Not(ST1) and CL) or
> (Not(SHN) and SH1 and SH2 and
> Not(CO34) and CO12 and CO5R and
> Not(ST2) and CL) or
> (Not(SHN) and SH1 and SH2 and
> Not(CO5R) and CO12 and CO34 and
> Not(1THRU4) and CL)

Thus the angular motor assembly 114 is rotated to the left when (a) the drive link 118 is in neutral and opposite third and fourth gears and either first or second gear is selected, or (b) the drive link 118 is in neutral and opposite fifth and reverse gears and any gear from first, second, third or fourth gears is selected, with the clutch being disengaged in any event. The signal SHFTDN is produced by the following Boolean equation:

> SHFTDN = (Not(SH1) and SHN and SH2 and
> CL and RETNEUT and GEAROK and
> PULLDOWN) or
> (Not(SHN) and SH1 and SH2 and
> CL and RETNEUT and SPED2 and
> Not(CO12) and CO34 and CO5R and
> Not(ST2)) or
> (Not(SHN) and SH1 and SH2 and
> CL and RETNEUT and SPED4 and
> Not(CO34) and CO12 and CO5R and
> Not(ST4)) or
> (Not(SHN) and SH1 and SH2 and
> CL and RETNEUT and SPEDR and
> Not(CO5R) and CO12 and CO34 and
> Not(STR))

Thus the linear motor assembly 112 moves the drive link down if (a) the drive link 118 is in the upper limit and PULLDOWN is active, (b) the drive link 118 is in neutral opposite first and second gears and second gear is selected, (c) the drive link 118 is in neutral opposite third and fourth gears and fourth gear is selected, or (d) the drive link 118 is in neutral opposite fifth and reverse gears and reverse is selected, in any case the clutch being disengaged, the speed of the vehicle being proper for the selected gear and RETNEUT being satisfied. Lastly, the signal SHFTUP is formed by the following equation:

> SHFTUP = (Not(SH2) and SHN and SH2 and
> CL and RETNEUT and GEAROK and
> Not(CO12) and CO34 and CO5R and
> ST2) or
> (Not(SH2) and SHN and SH2 and
> CL and RETNEUT and GEAROK and
> Not(CO34) and CO12 and CO5R and
> ST4) or
> (Not(SH2) and SHN and SH2 and
> CL and RETNEUT and GEAROK and
> Not(CO5R) and CO12 and CO34 and
> STR) or
> (Not(SHN) and SH1 and SH2 and
> CL and RETNEUT and SPED1 and
> Not(CO12) and CO34 and CO5R and -continued

```
Not(ST1)) or
(Not(SHN) and SH1 and SH2 and
CL and RETNEUT and SPED3 and
Not(CO34) and CO12 and CO5R and
Not(ST3)) or
(Not(SHN) and SH1 and SH2 and
CL and RETNEUT and
Not(CO5R) and CO12 and CO34 and
Not(ST5))
```

Thus the linear motor assembly 112 moves the drive link up if (a) the drive link 118 is in second gear and second gear is not selected, (b) the drive link 118 is in fourth gear and fourth gear is not selected, (c) the drive link 118 is in reverse gear and reverse gear is not selected, (d) the drive link 118 is in neutral opposite first and second gears and first gear is selected, (e) the drive link 118 is in neutral opposite third and fourth gears and third gear is selected, or (f) the drive link 118 is in neutral opposite fifth and reverse gears and fifth gear is selected, in any case the clutch being disengaged, the speed of the vehicle being proper for the selected gear and RETNEUT being satisfied.

The four signals COCW, COCCW, SHFTDN and SHFTUP cooperate to provide the sequence of motions to provide the requested gear. Because motion of the drive link 118 changes the position signals SH1, SHN, SH2, CO12, CO34 and CO5R, the four Boolean equations listed above provide control to reach the desired gear.

In each situation where control module 32 refuses to issue a command signal in response to an operator signal, control module 32 also functions to send a signal through lead 94 to instrument panel module 34 to illuminate bulb 98 and indicate to the operator that the desired shift is inappropriate and will not be carried out. Bulb 98 thus constitutes an illegal or inappropriate shift indicator. For example, selection of a gear that would over rev the engine to a point where the engine might be damaged would be prohibited and the fact that the operator has selected an inappropriate gear would be indicated by an appropriate signal transmitted through lead 94 to illuminate illegal shift built 98 in the instrument panel module 101.

The invention electric shift apparatus will be seen to have many advantages. Specifically, the modular assemblies minimize components and inventory requirements; the ease of assembly of the modules minimizes assembly plant labor; the control and power modules may be pretested prior to delivery to the vehicle manufacturer with consequent improvements in reliability and warranty costs; and in general, the invention electric shift apparatus retains the low initial cost and superior mileage advantages of a manual transmission while eliminating the requirement to actually physically shift the gears.

Whereas a preferred embodiment of the invention has been illustrated and described in detail it will be apparent that various changes may be made in the disclosed embodiment without departing from the spirit or scope of the invention.

We claim:

1. An electric shift apparatus for controlling a manual transmission having a plurality of shift components selectively movable to provide a plurality of forward speed positions and a neutral position, said apparatus comprising:

(A) a control assembly, including a gear selector assembly adapted to be positioned in the passenger compartment of the vehicle and including gear selector means having respective select positions corresponding to each position of the transmission, operative in response to operator selection to generate a plurality of electrical control signals respectively corresponding to each position of the transmission; and (B) an electrical power module adapted to be secured to the housing of the transmission and operative in response to receipt of each of said control signals to impart a specific combination and sequence of angular and axial movements to said shift components to move the transmission respectively to the transmission position corresponding to the received control signal.

2. An electric shift apparatus according to claim 1 wherein:

(C) said control assembly includes a control module, including comparator means, and position sensing means operative to sense the position of the transmission and operative to generate an electrical position signal indicative of the sensed position of the transmission; and (D) said comparator means is operative to receive gear select signals from said gear selector assembly and said position signals, compare said signals, and transmit an electrical control signal to said power module coded to energize said power module in a sense to move the transmission to the selected position.

3. An electric shift apparatus according to claim 2 wherein:

(E) said comparator means is further operative in response to arrival of the transmission in the selected position to deenergize and brake said electrical power module.

4. An electric shift apparatus according to claim 2 wherein:

(E) said comparator means is further operative to receive a vehicle speed signal and compare the received gear select signal with the received vehicle speed signal before energizing the electric power module so as to prohibit shifts that would be harmful to the transmission or the associated engine.

5. An electric shift apparatus according to claim 4 wherein:

(F) said electric shift apparatus further includes means for generating a vehicle clutch disengage signal; and (G) said comparator means is further operative to refuse to generate a shift signal in the absence of a clutch disengage signal.

6. An electric shift apparatus for controlling a manual transmission having a plurality of forward speed positions and a neutral position, said apparatus comprising:

(A) a gear selector assembly adapted to be positioned in the passenger compartment of the vehicle and including gear selector means having respective select positions corresponding to each position of the transmission and operative in response to operator selection to generate a plurality of electrical gear select signals respectively corresponding to each position of the transmission;

(B) an electrical power module adapted to be secured t the housing of the transmission and operative; and (C) a control module, including comparator means, and position sensing means operative to sense the position of the transmission and operative to generate an electrical position signal indicative of the sensed position of the transmission;

(D) said comparator means being operative to receive said gear select signals and said position signals, compare said signals, and transmit an electrical control signal to said power module coded to energize said power module in a sense to move the transmission to the selected position;

(E) said comparator means being further operative in response to arrival of the transmission in the selected position to deenergize and break said electrical power module;

(F) said electrical power module including a drive link adapted to be connected at one end to the transmission, and electric motor means operative to impart linear and angular movement to said drive link to shift the transmission between its various positions.

7. An electric shift apparatus according to claim 6 wherein:

(G) said electric power module includes a first electric motor means having a linearly movable output member operative to impart linear movement to said drive link and a second electric motor means having an angularly movable output shaft operative to impart angular movement to said drive link.

8. An electric shift apparatus according to claim 7 wherein:

(H) said position sensing means includes first position sensing means operative to sense the linear position of said output member and second position sensing means operative to sense the angular position of said output shaft.

9. An electric shift apparatus according to claim 8 wherein:

(I) said first position sensing means includes a first plurality of limit switches arranged along the linear path of said output member and sensing the linear position of said output member and said second position sensing means includes a second plurality of limit switches arrayed about said output shaft and sensing the angular position of said output shaft.

10. An electric shift apparatus according to claim 9 wherein:

(J) said electric power module includes a joint mechanism mounting the other end of said drive link for linear and angular movement.

11. An electric shift apparatus according to claim 10 wherein:

(K) said joint mechanism includes a fork member drivingly connected to said output shaft so as to be rotated thereby and including opposite arm portions having slots therein; and (l) said other end of said drive link includes pins guiding in said slots.

12. An electric shift apparatus according to claim 11 wherein:

(L) said joint mechanism further includes a journal member at the free end of said output member;

(M) said other end of said drive link is journaled in said journal member.

13. An electric shift apparatus according to claim 12 wherein:

(N) said first electric motor means comprises an electric motor driving a ball screw assembly including a nut member constituting said output member.

14. An electric shift apparatus according to claim 13 wherein:

(O) said second electric motor means comprises an electric motor driving a speed reduction unit having an output shaft constituting said output shaft.

15. An electric shift apparatus according to claim 14 wherein:

(P) said first position sensing means includes a cam means on said journal member selectively coacting with said first plurality of limit switches; and (Q) said second position sensing means includes a cam member on said output shaft selectively coacting with said second plurality of limit switches.

16. An electric shift apparatus according to claim 15 wherein:

(R) said electric power module further includes a bracket adapted to be bolted to the transmission housing; and (S) said first and second electric motor means are mounted on opposite ends of said bracket with said joint mechanism and said drive link positioned therebetween.

17. An electric shift apparatus for controlling a manual transmission having a plurality of forward speed positions and a neutral position, said apparatus comprising:

(A) a gear selector assembly adapted to be positioned in the passenger compartment of the vehicle and including gear selector means having respective select positions corresponding to each position of the transmission and operative in response to operator selection to generate a plurality of electrical gear select signals respectively corresponding to each position of the transmission;

(B) an electrical power module adapted to be secured to the housing of the transmission; and (C) a control module, including comparator means, and position sensing means operative to sense the position of the transmission and operative to generate an electrical position signal indicative of the sensed position of the transmission;

(D) said comparator means being operative to receive said gear select signals and said position signals, compare said signals and transmit an electrical control signal to said power module coded to energize said power module in a sense to move the transmission to the selected position;

(E) said comparator means being further operative to receive a vehicle speed signal and compare the received gear select signal with the received vehicle speed signal before energizing the electrical power module so as to prohibit shifts that would be harmful to the transmission or the associated engine;

(F) said electric shift apparatus further including indicator means adapted to be positioned in the passenger compartment of the vehicle and operative to indicate whether the selected gear position represents an allowed sift for the transmission.

18. An electric shift apparatus according to claim 17 wherein:

(G) said indieator means includes an illegal shift light adapted to be positioned in the instrument panel of the vehicle; and (H) said comparator means is operative to illuminated said illegal shift light when the received gear select signal is inappropriate in view of the received vehicle speed signal.

19. An electric shift apparatus according to claim 18 wherein:
(I) said indicator means further includes a shift complete light adapted to be positioned in the instrument panel of the vehicle; and
(J) said comparator means is further operative to illuminate said shift complete light when said transmission arrives in the selected position.

20. An electric shift apparatus for controlling a manual multispeed motor vehicle transmission of the type including a housing, a plurality of parallel axially extending shifter rails within the housing and each including a plurality of drive gears for selective engagement with further transmission gears in response to selective axially movement of the respective rail, and a mode select member selectively engagable with each of the rails and movable in a first crossover direction to select a particular rail and in a second shift direction to move the selected rail axially, said electric shift apparatus comprising:
(A) a gear selector assembly adapted to be positioned in the passenger compartment of the motor vehicle and including gear selector means selectively actuable by the vehicle operator to select a plurality of gear positions each corresponding to a specific crossover and shift position of the mode select member, and means operative to generate a plurality of electrical gear select signals corresponding respectively to each position of said gear selector means;
(B) a power module adapted to be secured to the transmission housing and including an electric drive mechanism adapted to be connected to the mode select member and operative when actuated to impart a combination of crossover and shift movements to said mode select member;
(C) means sensing the crossover and shift position of the mode select member and operative to generate an electrical position signal indicative of the crossover and shift position of the mode select member; and
(D) a control module operative to receive said electrical gear select signals and said electrical position signals, to compare said signals, and to transmit an electrical control signal to said electrical drive mechanism coded to impart the specific combination and sequence of crossover and shift movements to the mode select member required to move the mode select member from its indicated crossover and shift positions to the crossover and shift positions corresponding to the operator selected position.

21. An electric shift apparatus according to claim 20 wherein:
(E) said electric drive mechanism includes first electric motor means operative to impart shift movement to the mode select lever and second electric motor means operative to impart crossover movement to the mode select member.

22. An electric shift apparatus according to claim 20 wherein:
(E) said electric drive mechanism includes a drive link adapted to be connected at one end to the mode select member and electric motor means operative to impart linear and angular movement to said drive link to move the mode select member in its shift and crossover directions respectively.

23. An electric shift apparatus according to claim 22 wherein:
(F) said electric motor means includes first electric motor means having a linearly movable output member and operative to impart linear movement to said drive link, and second electric motor means having an angularly movable output shaft and operative to impart angular movement to said drive link.

24. An electric shift apparatus according to claim 23 wherein:
(G) said position sensing means includes first position sensing means operative to sense the linear position of said output member and second position sensing means operative to sense the angular position of said output shaft.

25. An electric shift apparatus according to claim 24 wherein:
(H) said first position sensing means includes a first plurality of limit switches arranged along the linear path of said output member and sensing the linear position of said output member, and said second position sensing means includes a second plurality of limit switches arrayed about said output shaft and sensing the angular position of said output shaft.

26. An electric shift apparatus according to claim 25 wherein:
(I) said electric drive mechanism includes a joint mechanism mounting the other end of said drive link for linear and angular movement.

27. An electric shift apparatus according to claim 26 wherein:
(J) said joint mechanism includes a fork member drivingly connected to said output shaft so as to be rotated thereby and including opposite arm portions having slots therein; and
(K) said other nd of said drive link includes pins guiding in said slots.

28. An electric shift apparatus according to claim 27 wherein:
(L) said joint mechanism further includes a journal member at the free end of said output member;
(M) said other end of said drive link is journaled in said journal member.

29. An electric shift apparatus according to claim 28 wherein:
(N) said first electric motor means comprises an electric motor driving a ball screw assembly including a nut member constituting said output member.

30. An electric shift apparatus according to claim 29 wherein:
(O) said second elecric motor means comprises an electric motor driving a speed reduction unit having an output shaft constituting said output shaft.

31. An electric shift apparatus according to claim 30 wherein:
(P) said first position sensing means includes a cam means on said journal member selectively coacting with said first plurality of limit switches; and
(Q) said second position sensing means includes a cam member on said output shaft selectively coacting with said second plurality of limit switches.

32. An electric shift apparatus according to claim 31 wherein:

(R) said electric drive mechanism further includes a bracket adapted to be bolted to the transmission housing; and (S) said first and second electric motor means are mounted on opposite ends of said bracket with said joint mechanism and said drive link positioned therebetween.

33. An electric shift apparatus according to claim 20 wherein:

(E) said control module includes comparator means receiving said gear selector and said position signals, operative in response to receipt of a gear selector signal differing from the received position signal to energize said electric drive mechanism, and operative in response to arrival of the mode select member in the selected position to deenergize and brake said electric drive mechanism.

34. An electric shift apparatus according to claim 33 wherein:

(F) said control means further receives a vehicle speed signal; and (G) said comparator means is further operative to compare the received gear select signal with the received vehicle speed signal before energizing the electric drive mechanism so as to prohibit shifts that would be harmful to the transmission or the associated engine.

35. An electric shift apparatus according to claim 34 wherein:

(H) said electric shift apparatus further includes indicator means adapted to be positioned in the passenger compartment of the vehicle and operative to indicate whether the selected gear position represents an allowed shift for the transmission.

36. An electric shift apparatus according to claim 35 wherein:

(I) said indicator means includes an illegal shift light adapted to be positioned in the instrument panel of the vehicle; and (J) said comparator means is operative to illuminate said illegal shift light when the received gear select signal is inappropriate in view of the received vehicle speed signal.

37. An electric shift apparatus according to claim 36 wherein:

(K) said indicator means further includes a shift complete light adapted to be positioned in the instrument panel of the vehicle; and (L) said comparator means is further operative to illuminate said shift complete light when said mode select member arrives in the selected position.

38. An electric shift apparatus according to claim 34 wherein:

(H) said control means further includes a vehicle clutch disengage signal; and (I) said comparator means is further operative to refuse to generate a shift signal in the absence of a clutch disengage signal.

39. In a multi-speed manual transmission for a motor vehicle of the type including a housing, a plurality of parallel axially extending shifter rails within said housing and each carrying a plurality of drive gears for selective engagement with further transmission gears in response to selective axial movement of the respective rail, a mode select member selectively engagable with each of the rails, and means for moving said mode select member in a first crossover direction to select a particular rail and in a second shift direction to move the selected rail axially, the improvement wherein said moving means comprises:

(A) a gear selector assembly adapted to be positioned in the passenger compartment of the motor vehicle and including gear selector means selectively actuable by the vehicle operator to select a plurality of gear positions each corresponding to a specific crossover and shift position of the mode select member, and means operative to generate a plurality of electrical gear select signals corresponding respectively to each position of the gear selector means;

(B) a power module adapted to be secured to the transmission housing and including an electric drive mechanism adapted to be connected to the mode select member and operative when actuated to impart a combination of crossover and shift movements to said mode select member;

(C) means sensing the crossover and shift position of the mode select member and operative to generate an electrical position signal indicative of the crossover and shift position of the mode select member; and (D) a control module operative to receive said electrical gear select signals and said electrical position signals, to compare said signals, and to transmit an electrical control signal to said electrical drive mechanism coded to impart the specific combination and sequence of crossover and shift movements to the mode select lever required to move the mode select lever from its indicated crossover and shift positions to the crossover and shift positions corresponding to the operator selected position.

* * * * *

UNITED STATES PATENT AND TRADEMARK OFFICE
CERTIFICATE OF CORRECTION

PATENT NO. : 4,817,468

DATED : April 4, 1989

INVENTOR(S) : Leigh-Monstevens et al

It is certified that error appears in the above-identified patent and that said Letters Patent is hereby corrected as shown below:

Column 4, line 9, "in 1" should be --in Fig. 1--.

Column 4, line 14, "shift a" should be --shift apparatus--.

Column 4, line 18, "in the shift" should be --in the invention shift--.

Column 6, line 26, "118ib" should be --118b--.

UNITED STATES PATENT AND TRADEMARK OFFICE
CERTIFICATE OF CORRECTION

PATENT NO. : 4,817,468

DATED : April 4, 1989

INVENTOR(S) : Leigh-Monstevens et al.

It is certified that error appears in the above-identified patent and that said Letters Patent is hereby corrected as shown below:

Column 12, lines 67 & 68, "an electrical power module adapted to be secured t the housing of the transmission and operative; and" should read --an electrical power module adapted to be secured to the housing of the transmission and operative in response to receipt of each of said gear select signals to move the transmission respectively to the transmission position corresponding to the received gear select signal--.

Signed and Sealed this

Twenty-sixth Day of June, 1990

Attest:

HARRY F. MANBECK, JR.

Attesting Officer     Commissioner of Patents and Trademarks